United States Patent [19]

Nishikawa

[11] 4,251,226
[45] Feb. 17, 1981

[54] DEVICE FOR PREVENTING BACKFIRE OF INFLAMMABLE GASES

[75] Inventor: Shigeo Nishikawa, Osaka, Japan

[73] Assignee: Yamato Sangyo Inc., Osaka, Japan

[21] Appl. No.: 105,547

[22] Filed: Dec. 20, 1979

[51] Int. Cl.³ .............................................. F17D 3/00
[52] U.S. Cl. .................................. 48/192; 137/512.2; 251/65; 431/346
[58] Field of Search .............. 48/192; 137/512.2, 540, 137/528; 251/65; 220/88 R; 431/346; 222/189

[56] References Cited

U.S. PATENT DOCUMENTS

| | | | |
|---|---|---|---|
| 2,109,202 | 2/1938 | Raney | 137/540 |
| 2,212,486 | 8/1940 | Zoder | 220/88 R |
| 2,482,457 | 9/1949 | Boedecker | 48/192 |
| 2,667,895 | 2/1954 | Pool et al. | 251/65 |
| 2,940,472 | 6/1960 | Chilcoat | 137/540 |

*Primary Examiner*—S. Leon Bashore
*Assistant Examiner*—Michael L. Goldman
*Attorney, Agent, or Firm*—Koda & Androlia

[57] ABSTRACT

A device for preventing backfire of inflammable gases comprising a cylinder, a balance spring, and a repelling magnet case. The cylinder holds both a valve casing whose rear edge shuts a gas induction passage when the casing is pushed backward by high pressure, and a check valve which contains a repelling magnet and which shuts and opens a gas supplying passage and a flow-way formed in the valve casing. The repelling magnet case, which is pushed backward by the balance spring, contains a repelling magnet aligned face-to-face with a magnet that is contained in the check valve.

6 Claims, 8 Drawing Figures

DEVICE FOR PREVENTING BACKFIRE OF INFLAMMABLE GASES

BACKGROUND OF THE INVENTION

1. Field of the Invention

This invention relates to a device for preventing backfire of inflammable gases and more particularly to a device for preventing backfire of inflammable gases with safety mechanism.

2. Prior Art

In the prior art there existed several types of devices designed to prevent backfire of inflammable gases. None of them has ever been successfully perfect in their mechanism and sometimes caused explosions during operation. They were, therefore, very dangerous for their operators.

SUMMARY OF THE INVENTION

Accordingly, it is the primary object of this invention to provide a device for preventing backfire of inflammable gases that readily controls backfire eliminating the danger of explosions.

With this invention, the backfire of inflammable gas is prevented by a unique device comprised of a cylinder, a balance spring and a repelling magnet case. The cylinder holds both a valve casing whose rear edge shuts the gas induction passage when the casing is pushed backward by high pressure, and a check valve which contains a repelling magnet and which shuts and opens the gas supplying passage and the flow-way formed in the valve casing. The repelling magnet case, which is pushed backward by the balance spring, contains a repelling magnet aligned face-to-face with the magnet contained in the check valve.

BRIEF DESCRIPTION OF THE DRAWINGS

The principles and objects of the present invention will become more apparent in the below description in conjunction with the following drawings.

DESCRIPTION OF THE PREFERRED EMBODIMENT

Figure 1:
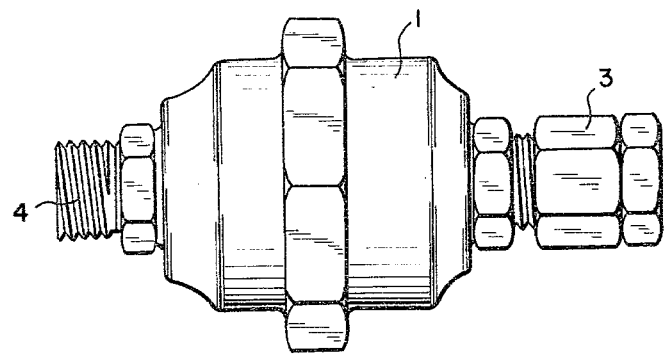
FIG. 1 is a front view of an embodiment of the above-mentioned device for preventing backfire of inflammable gases.

The present invention is designed to prevent inflammable gas backfire and comprises a cylinder 5, a balance spring 18 and a repelling magnet case 19.

A case 1 is connected at its rear edge with a gas-induction pipe which is held by a joint 3 and interconnected with a pressure regulator (not illustrated). The front edge of the case 1 is equipped with a joint 4 with which a gas tube (not illustrated) is connected.

Inside the case 1, between the gas-induction pipe 2 and the joint 4, a cylinder 5, equipped with a mechanism for preventing backfire, is provided as explained below.

A valve casing 6 is set as to move back and forth in the cylinder 5. At the front of the casing 6 a check valve 7 which moves forward from the casing 6 upon receiving gas pressure, and in the central part of the casing 6, a spring 8 is inserted at both edges of which are provided compression spheres 9 which press upon a step 10 formed in the inner wall of the cylinder 5.

That is, the compression spheres 9 and 9 are pressing upon the step 10 because pressure is exerted upon them in turn by the spring 8, preventing the valve casing 6 from moving backward as long as it is subjected only to standard pressure. However, when the valve casing 6 is under high pressure, the compression spheres 9 and 9 push the spring 8 and move over the step 10. The casing 6 thus moves backward in the cylinder 5.

Moreover, the rear section of the valve casing 6 is formed so as to shut the open a gas-induction passage 11 and is covered with a rubber packing 12 so as to shut the passage 11 tightly. The rear section of the valve casing 6 is also formed to provide plural gas passages 13 that lead, through said spring 8, to a gas-supplying passage 14 which is located in the valve casing 6.

The check valve 7 is provided in order to shut and open the above-mentioned passage 14. It has an O-ring 15 attached to its rear section and a repelling magnet 16 built into its front face.

Another repelling magnet 17 is fixed, in frontal alignment with the above-mentioned repelling magnet 16, at the edge of the case 19, with the balance spring 18 projecting forward.

That is, both magnets 16 and 17 are of the same polarity and keep a fixed distance from each other because of their repulsive power. The check valve 7 is thus pushed backward to shut the gas-supplying passage 14.

A hole 20 formed in the front section of the cylinder 5, connects the space between the case 19 and the valve casing 6 with a fire-extinguishing compartment 21 provided outside the cylinder 5. This fire-extinguishing compartment 21 is equipped with a fire-extinguishing filter 22 made of sintered stainless steel and forms a passage 23 through which the gas passing through said filter 22 can be discharged to the inside of the joint 4.

The operation of the device for preventing backfire of inflammable gases of the present invention will be explained below. When the gas is on for an operation such as welding, the gas coming from the pressure regulator, being properly pressed, proceeds through the passage 11 into the cylinder 5, then enters through the passage 13 into the supplying passage 14 and pushes the check valve 7 forward against the repulsive power of the magnets 16 and 17.

When the check valve 7 moves forward, away from the casing 6, an opening is formed between the check valve and the casing 6 through which the gas can flow. Then, the gas goes through the fire-extinguishing filter 22, the passage 23 and the inside of the joint 4. The gas can thus go through the system.

Should the flame moves backward into the device, the high pressure generated by the backfire causes the case 19 to move backward and make the check valve 7 shut the passage 14. Moreover, if a backfire is to occur inside of the case 1 through the passage 23, it is extinguished by the above-mentioned filter 22.

When the case 19 moves backward, the check valve 7 and the valve casing 6 are pushed backward so as to shut the gas induction passage 11.

Figures 3, 8:
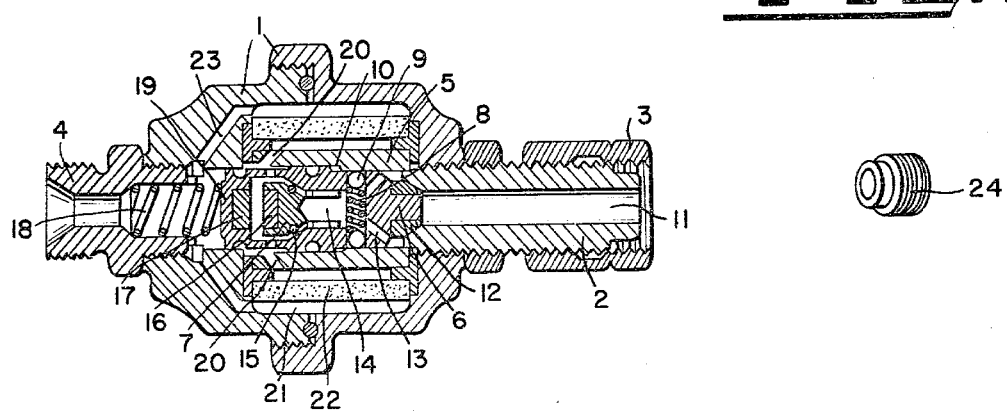
FIG. 3 is a longitudinal sectional view of the same device showing a closed position.
FIG. 8 is a perspective view of a cylindrical screw used in the second embodiment.

That is, if the valve casing 6 is pushed backward by the pressure of the backfire, the compression spheres 9 and 9 sink into their housing and pass over the step 10. Accordingly, the rear edge of the valve casing 6, as shown in FIG. 3, presses tightly against the edge of the passage 11, closing it.

Figure 2:
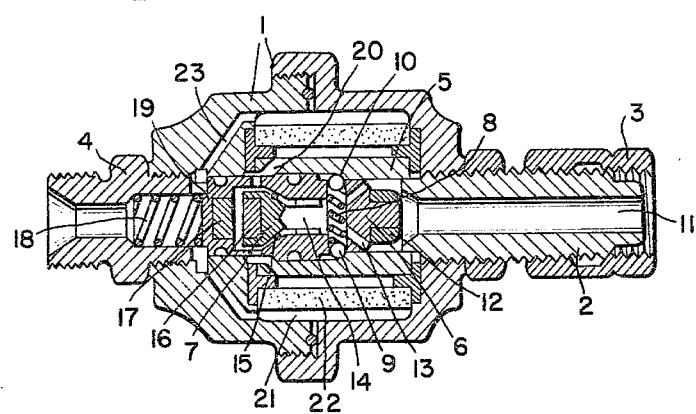
FIG. 2 is a longitudinal sectional view of the device shown in FIG. 1.
Figure 4:
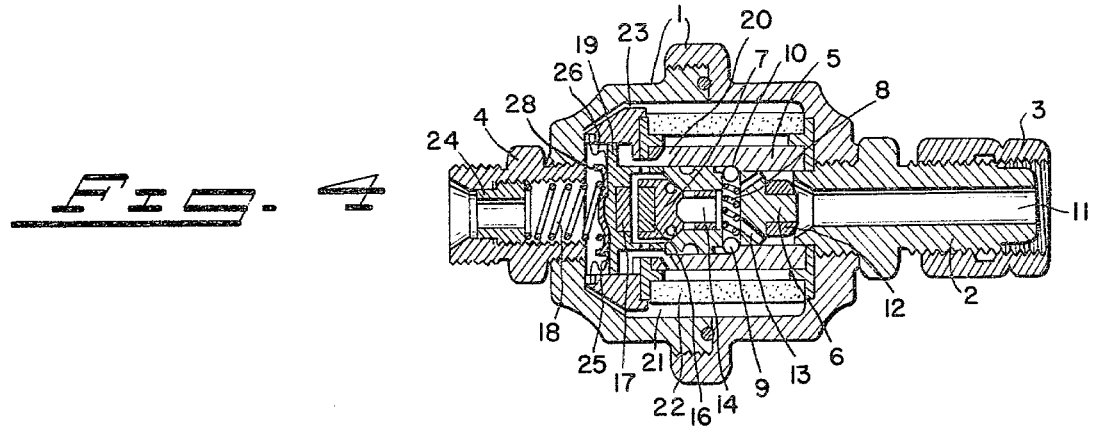
FIG. 4 is a longitudinal sectional view of a second embodiment of this invention.
Figure 5:
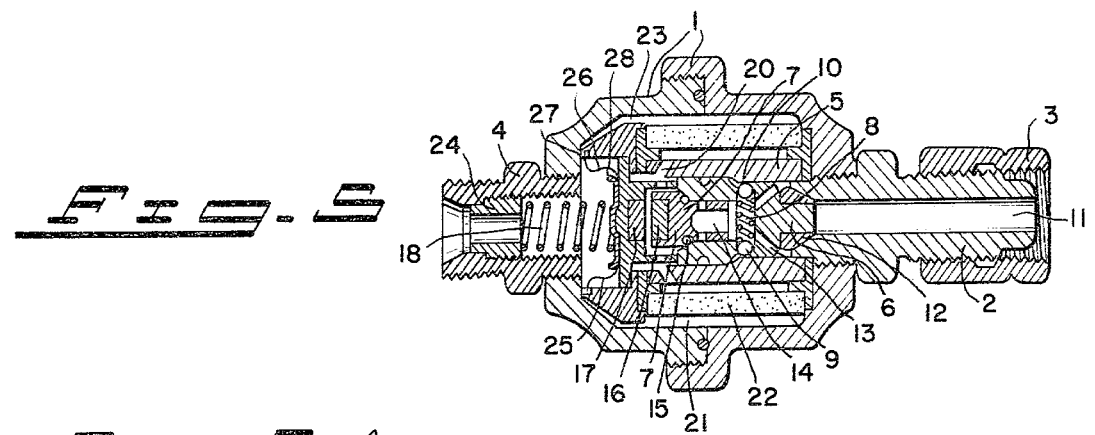
FIG. 5 is a longitudinal sectional view of the second embodiment showing the closed position.
Figure 6A:
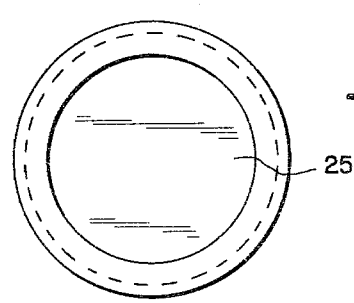
FIG. 6 (A), (B) and FIG. 7 (A), (B) show the structure of dish-shaped attachments used in the second embodiment.
Figure 6B:
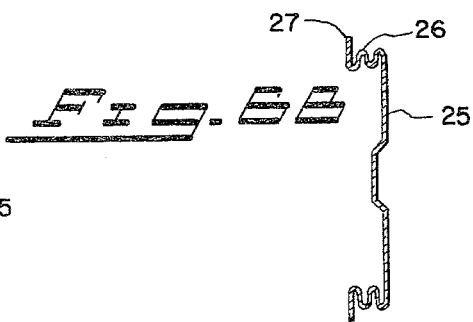
Figure 7A:
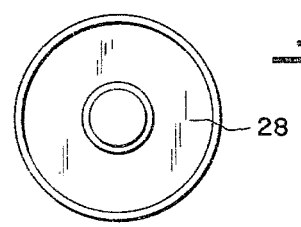
Figure 7B:
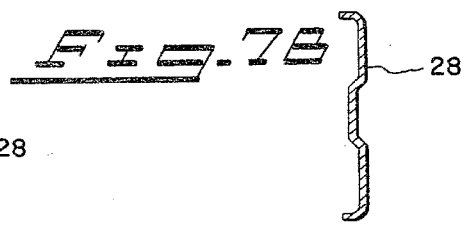

As another embodiment shown in FIG. 4, a cylindrical screw 24 (see FIG. 8), that pushes the balance spring 18 backward and that thus adjust the pushing force of the balance spring 18, is provided inside the front edge of the case 1. Further, the front edge of the repelling magnet case 19 is equipped with a dish-shaped attachment 25 with bellows 26 shown in FIG. 6, and a smaller dish-shaped attachment 28, shown in FIG. 7, that embraces the balance spring 18. The edge 27 of the dish-shaped attachment 26 is, as shown in FIG. 4, fixed to the inner wall of the front part of the cylinder 5 so as to shut the said cylinder 5 tightly. In case a backfire occurs, as shown in FIG. 5, the bellows 26 of the dish-shaped attachment 25 stretch, the repelling magnet case 19 is pushed backward and, as explained above in connection with FIGS. 2 and 3, the device starts to operate and stope the backfire.

As explained above, backfire can be prevented by the check valve 7 and valve casing 6, and extinguished by the filter 22 if it is to occur inside of the case 1. Consequently, explosions can be prevented without failure.

I claim:

1. A device for preventing backfire of inflammable gas comprising:
   a main case;
   a cylinder provided in the main case and having:
      a valve casing whose rear edge shuts a gas induction passage when said valve casing is pushed backward by high pressure provided with said cylinder, and
      a check valve that has a repelling magnet located in front of said valve casing and that shuts and opens both a gas supplying passage and flow way which are formed in said valve casing;
   a balance spring located at a gas exit passage; and
   a repelling magnet case that is pushed backward by said balance spring, and is equipped with a repelling magnet in frontal alignment with said magnet disposed in said check valve.

2. A device for preventing backfire of inflammable gases according to claim 1, further comprising a fire extinguishing filter disposed within said main case and external to said cylinder.

3. A device for preventing backfire of inflammable gases according to claim 1, wherein said valve casing is equipped at its near edge with a rubber packing to tightly shut the gas induction passage.

4. A device for preventing backfire of inflammable gases according to claim 1, further comprising a cylindrical screw for holding and for precisely adjusting the pushing force of said balance spring against said repelling magnet case.

5. A device for preventing backfire of inflammable gases according to claim 4, wherein said cylinder is equipped with a dish-shaped attachment to embrace said balance spring at one end.

6. A device for preventing backfire of inflammable gas comprising:
   a main case;
   a chamber provided in said main case;
   input and output passageways provided in said main case and communicating with said chamber;
   a hollow cylindrical member provided in said main case and connecting said input and said output passageways together, said cylindrical member dividing said chamber into an inner and outer chambers;
   a plurality of first openings provided in said cylindrical member adjacent to said end of said cylindrical member adjacent said output passageway;
   a fire extinguishing filter provided coaxially about said cylindrical member, said filter dividing said outer chamber into a first outer chamber between said filter and said cylindrical member and a second outer chamber between said filter and an inside member of said chamber;
   at least one gas passageway provided in said main case between said second outer chamber and said output passageway;
   a case slidably disposed in said cylindrical member and being closed at one end adjacent said output passageway and open at the other end;
   a plurality of second openings provided in said case adjacent to the first openings;
   a first magnet of a first polarity fixed within said case at the closed end thereof;
   a first check valve means provided in said case for closing said open end of said case when a reverse flow occurs;
   a second magnet of said first polarity provided on said first check valve opposite and adjacent to said first magnet whereby said first check valve is biased toward closing said open end of said case by repelling force between said first and second magnets;
   a valve casing provided in said cylindrical member for closing said input passageway, said valve casing engaging with said case and closing said open end of said case;
   a plurality of third openings provided in said valve casing, said third openings being provided such that when said valve casing is opened a gas flow can occur from said input passageway into said open end of said case; and
   a spring means provided adjacent to said output passageway for biasing said case toward said input passageway;
   whereby when a normal gas pressure is applied to said input passageway, gas flows through said third opening in said valve casing, said open end of said case, said first valve check, said second openings, said first openings, said filter and said gas passageway to said output passageway; while when a backfire occurs, a back pressure moves said case toward said input end to close said valve casing and the repelling force of said first check valve and said filter extinguishes any backfire.

* * * * *